US012337845B1

(12) United States Patent
White et al.

(10) Patent No.: US 12,337,845 B1
(45) Date of Patent: Jun. 24, 2025

(54) METHOD AND SYSTEM FOR AUTOMATICALLY DETECTING A VEHICLE ACCIDENT

(71) Applicant: UIPCO, LLC, San Antonio, TX (US)

(72) Inventors: Angelica Nichole White, Spring Beach, TX (US); Sean Carl Mitchem, San Antonio, TX (US); Sean Michael Wayne Craig, San Antonio, TX (US); Christopher Russell, The Colony, TX (US); Brian Howard Katz, San Antonio, TX (US); Subhalakshmi Selvam, Allen, TX (US); Roberto Virgillio Jolliffe, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 574 days.

(21) Appl. No.: 17/560,489

(22) Filed: Dec. 23, 2021

(51) Int. Cl.
*B60W 40/04* (2006.01)
*B60W 40/08* (2012.01)
(Continued)

(52) U.S. Cl.
CPC ............ *B60W 40/04* (2013.01); *B60W 40/08* (2013.01); *B60W 50/14* (2013.01); *G06N 20/00* (2019.01);
(Continued)

(58) Field of Classification Search
CPC .... G06Q 40/08; G06N 20/00; G02B 27/0172; B60W 30/08; B60W 40/04; B60W 40/08;
(Continued)

(56) References Cited

U.S. PATENT DOCUMENTS

| 6,853,849 B1 | 2/2005 | Tognazzini |
| 8,160,764 B2 | 4/2012 | Choi et al. |

(Continued)

FOREIGN PATENT DOCUMENTS

| DE | 102015209853 A1 | 12/2016 | |
| JP | 2010182287 A * | 8/2010 | ............. G06F 19/00 |

(Continued)

OTHER PUBLICATIONS

Wang, Junhua, et al. "Modeling when and where a secondary accident occurs." Accident Analysis & Prevention 130 (2019): 160-166. (Year: 2019).*

(Continued)

*Primary Examiner* — Cuong H Nguyen
(74) *Attorney, Agent, or Firm* — Potomac Law Group, PLLC; Dannon G. Allbee

(57) ABSTRACT

Methods and systems described herein are directed to automatedly detecting a vehicle accident occurrence based on a generated accident suspicion. An accident detection system can retrieve a myriad of information as data relating to a driver or a vehicle of the driver. The retrieved information can be assessed to determine assignment of a suspicion of a vehicle accident occurrence. The suspicion assignment can be based on, with respect to historical insurance data, predetermined thresholds and/or machine learning for the retrieved information. The retrieved information can be verified by auxiliary data remote from the driver or the vehicle of the driver. The accident detection system can verify the suspicion by dispatching one or more notifications to the driver, and in the absence of response, determine whether the suspicion is true via the collection of information for a suspected location of the accident or from individuals associated with the driver.

20 Claims, 9 Drawing Sheets

(51) Int. Cl.
*B60W 50/14* (2020.01)
*G06N 20/00* (2019.01)
*G06Q 40/08* (2012.01)
*B60W 30/16* (2020.01)

(52) U.S. Cl.
CPC ............. *G06Q 40/08* (2013.01); *B60W 30/16* (2013.01); *B60W 2520/00* (2013.01); *B60W 2556/10* (2020.02)

(58) Field of Classification Search
CPC .. B60W 40/09; B60W 2556/10; B60W 50/14; B60W 2520/00; B60W 30/0956; B60W 30/16; G01G 1/015
USPC .......................................... 701/117; 340/576
See application file for complete search history.

(56) References Cited

U.S. PATENT DOCUMENTS

| | | | |
|---|---|---|---|
| 8,731,977 B1 | 5/2014 | Hardin et al. | |
| 9,196,159 B1 | 11/2015 | Kerr | |
| 9,773,281 B1 | 9/2017 | Hanson | |
| 9,786,154 B1 | 10/2017 | Potter et al. | |
| 9,886,841 B1 | 2/2018 | Nave et al. | |
| 10,086,782 B1 | 10/2018 | Konrardy et al. | |
| 10,106,156 B1 | 10/2018 | Nave et al. | |
| 10,165,429 B1* | 12/2018 | Young | H04W 4/90 |
| 10,360,742 B1 | 7/2019 | Bellas et al. | |
| 10,580,306 B1 | 3/2020 | Harris et al. | |
| 10,586,122 B1 | 3/2020 | Gingrich et al. | |
| 10,660,806 B1 | 5/2020 | Nelson-Herron et al. | |
| 10,692,149 B1 | 6/2020 | Loo et al. | |
| 10,769,456 B2* | 9/2020 | Sathyanarayana et al. | G06K 9/00805 |
| 10,789,650 B1 | 9/2020 | Nave et al. | |
| 10,803,527 B1 | 10/2020 | Zankat et al. | |
| 10,853,882 B1 | 12/2020 | Leise et al. | |
| 10,867,495 B1 | 12/2020 | Venetianer et al. | |
| 11,107,161 B1 | 8/2021 | Hall | |
| 11,328,505 B2* | 5/2022 | Taccari | G08B 25/016 |
| 11,379,886 B1 | 7/2022 | Fields et al. | |
| 11,503,153 B1* | 11/2022 | Hansen | H04M 3/5232 |
| 11,620,862 B1* | 4/2023 | Serrao | G06T 13/80 345/419 |
| 11,669,590 B2 | 6/2023 | Hyland et al. | |
| 11,679,763 B2 | 6/2023 | Nagasawa | |
| 11,692,838 B1* | 7/2023 | Gibson | B60W 50/082 701/25 |
| 11,735,050 B2 | 8/2023 | Garg et al. | |
| 11,781,883 B1 | 10/2023 | Dabell | |
| 2011/0117878 A1 | 5/2011 | Barash et al. | |
| 2014/0379523 A1 | 12/2014 | Park | |
| 2015/0084757 A1 | 3/2015 | Annibale et al. | |
| 2015/0145695 A1 | 5/2015 | Hyde et al. | |
| 2016/0009279 A1 | 1/2016 | Jimaa et al. | |
| 2016/0169688 A1 | 6/2016 | Kweon et al. | |
| 2017/0053461 A1 | 2/2017 | Pal et al. | |
| 2017/0072850 A1* | 3/2017 | Curtis | B60W 50/0097 |
| 2017/0213462 A1 | 7/2017 | Prokhorov | |
| 2017/0248949 A1 | 8/2017 | Moran et al. | |
| 2017/0248950 A1 | 8/2017 | Moran et al. | |
| 2018/0061253 A1* | 3/2018 | Hyun | G08G 1/0175 |
| 2018/0286248 A1 | 10/2018 | Choi et al. | |
| 2018/0293864 A1 | 10/2018 | Wedig et al. | |
| 2018/0297593 A1 | 10/2018 | Pitale et al. | |
| 2018/0300964 A1 | 10/2018 | Lakshamanan et al. | |
| 2018/0308342 A1 | 10/2018 | Hodge | |
| 2018/0308344 A1 | 10/2018 | Ravindranath et al. | |
| 2018/0364722 A1 | 12/2018 | Schlesinger et al. | |
| 2019/0095877 A1 | 3/2019 | Li | |
| 2019/0174289 A1 | 6/2019 | Martin et al. | |
| 2019/0202448 A1 | 7/2019 | Pal et al. | |
| 2019/0253861 A1 | 8/2019 | Horelik et al. | |
| 2019/0327597 A1 | 10/2019 | Katz et al. | |
| 2019/0385457 A1 | 12/2019 | Kim et al. | |
| 2020/0043097 A1 | 2/2020 | Aznaurashvili et al. | |
| 2020/0059776 A1 | 2/2020 | Martin et al. | |
| 2020/0105120 A1 | 4/2020 | Werner et al. | |
| 2020/0274962 A1 | 8/2020 | Martin et al. | |
| 2020/0312046 A1 | 10/2020 | Righi et al. | |
| 2021/0023946 A1 | 1/2021 | Johnson et al. | |
| 2021/0027409 A1 | 1/2021 | Nair et al. | |
| 2021/0061209 A1 | 3/2021 | Park et al. | |
| 2021/0217120 A1 | 7/2021 | Del Forn et al. | |
| 2021/0219257 A1 | 7/2021 | Anand et al. | |
| 2021/0225155 A1* | 7/2021 | Potter | G06Q 40/08 |
| 2021/0256257 A1* | 8/2021 | Taccari | G08B 29/188 |
| 2021/0266732 A1 | 8/2021 | Zhou et al. | |
| 2021/0304593 A1* | 9/2021 | Matus | G08G 1/0129 |
| 2022/0044024 A1* | 2/2022 | Sambo | G06T 7/20 |
| 2022/0058701 A1 | 2/2022 | Fuchs | |
| 2022/0063609 A1 | 3/2022 | Nagasawa | |
| 2022/0095975 A1 | 3/2022 | Aluf et al. | |
| 2022/0169175 A1 | 6/2022 | Choi | |
| 2022/0321343 A1 | 10/2022 | Bahrami et al. | |
| 2022/0383256 A1 | 12/2022 | Roh et al. | |
| 2023/0001871 A1 | 1/2023 | Neubauer et al. | |
| 2023/0122572 A1 | 4/2023 | Choi | |
| 2023/0166743 A1* | 6/2023 | Heck | B60W 50/0097 |
| 2023/0169845 A1 | 6/2023 | Turner et al. | |
| 2023/0211780 A1* | 7/2023 | Tanaka | B60W 50/0097 340/576 |
| 2023/0242099 A1 | 8/2023 | Pishehvari et al. | |
| 2023/0282350 A1* | 9/2023 | Devore | G16H 40/20 |
| 2023/0298468 A1* | 9/2023 | Jha | G08G 1/164 701/117 |
| 2024/0089701 A1 | 3/2024 | Motoyama et al. | |
| 2024/0169296 A1 | 5/2024 | Watfa et al. | |

FOREIGN PATENT DOCUMENTS

| | | | | |
|---|---|---|---|---|
| JP | 2015504616 A | * | 2/2015 | ......... G02B 27/0172 |
| JP | 6940612 B2 | * | 9/2021 | ........... G05D 1/0055 |
| JP | 7470486 B2 | * | 4/2024 | ............ B60W 40/09 |
| WO | WO-2019028349 A1 | * | 2/2019 | ............ B60W 40/09 |
| WO | WO-2022201639 A1 | * | 9/2022 | ......... A61B 5/02405 |

OTHER PUBLICATIONS

Chong, Miao, Ajith Abraham, and Marcin Paprzycki. "Traffic accident data mining using machine learning paradigms." Fourth International Conference on Intelligent Systems Design and Applications (ISDA'04), Hungary. 2004. (Year: 2004).*

Santos, Daniel, et al. "Machine learning approaches to traffic accident analysis and hotspot prediction." Computers 10.12 (2021): 157. (Year: 2021).*

Kumeda, Bulbula, et al. "Classification of road traffic accident data using machine learning algorithms." 2019 IEEE 11th international conference on communication software and networks (ICCSN). IEEE, 2019. (Year: 2219).*

Kumeda, Bulbula, et al. "Classification of road traffic accident data using machine learning algorithms." 2019 IEEE 11th international conference on communication software and networks (ICCSN). IEEE,. (Year: 2019).*

* cited by examiner

METHOD AND SYSTEM FOR AUTOMATICALLY DETECTING A VEHICLE ACCIDENT

TECHNICAL FIELD

The present disclosure is directed to systems and methods for automatedly detecting a vehicle accident occurrence based on verification of a generated accident suspicion.

BACKGROUND

Vehicle accidents are always unwelcomed experiences that often cause a driver of a vehicle to experience a wide range of emotions. Because of this, recall of the conditions which led up to, and which otherwise may have actually caused, an accident may become blurred with increasing passage of time. As a result, such distortion(s) may hamper each of an ability to accurately know the reason for the accident, and consequently, an ability to accurately undertake applicable insurance claim(s) processing. Furthermore, it can be important to immediately and accurately determine whether an accident has occurred. For example, dispatching of emergency services, alerting other drivers, and gathering data about the accident can all be extremely time sensitive and expensive if performed unnecessarily.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
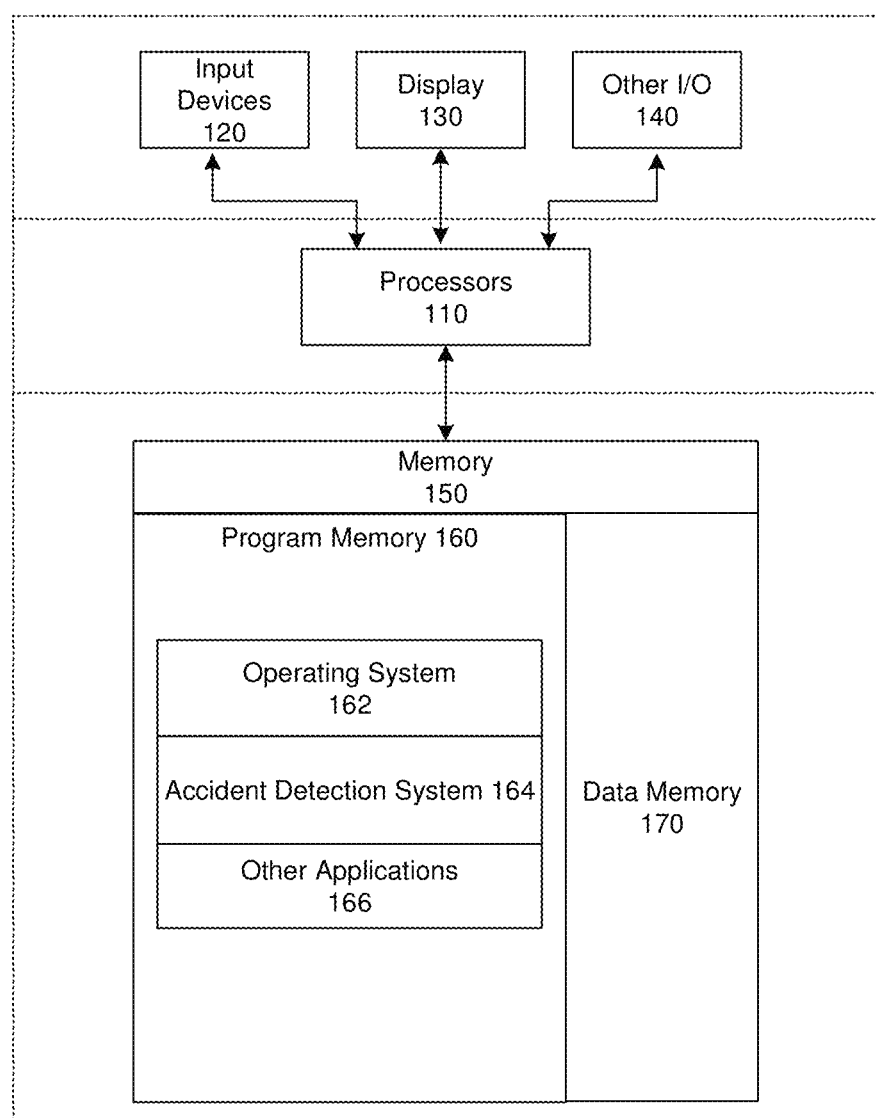
FIG. 1 is a block diagram illustrating an overview of devices on which some implementations can operate.

Aspects of the present disclosure are directed to automatedly detecting a vehicle accident occurrence based on verification of a generated accident suspicion. A detection system can, upon a driver of a vehicle granting permission for its collection, collect information (or data) from a myriad of information sources such as, for example, data describing movement of the vehicle, communications and/or movement data of one or more electronic devices accompanying the driver while the driver is in the vehicle, and/or biometric data derived from one or more wearables used by the driver, to name a few. In some implementations, such data can be personal to the driver. Herein, the term "personal data" means any data for which the driver has the option to divulge, and has then affirmatively opted to divulge, whether derived from his or her person, vehicle, and/or any instrument or device which the driver uses or intends to use. Based on receipt of the personal data, the detection system can assign a suspicion for an accident occurrence involving the driver.

As an example, the detection system can analyze one or more of movement patterns associated with the vehicle and/or electronic devices of the driver which are included in the vehicle for assigning the suspicion of an accident occurrence involving the driver. The movement patterning of each of the vehicle and its included electronic devices can be derived from a respectively included inertia measurement unit (IMU) configured to measure aspects such as received, i.e., specific, force, angular rate, rotation and/or magnetic force, for instance. In this regard, movement patterns of the vehicle can be compared to, for instance, known accident associated movements of a same or similar vehicle having a given make, model, and year of the driver's vehicle for determining whether the suspicion of the accident occurrence ought to be assigned. Still further, the detection system can analyze movement patterns of any electronic devices which may be included within the vehicle at a time of a suspected accident occurrence involving the driver. That is, analysis of such electronic device movement patterns can include a comparison of movement patterns among a plurality of such devices to determine whether descriptions of the respectively obtained movement patterns each describe one or more same or similar movements that likely indicate a vehicle accident occurrence. The same analysis can be conducted with respect to one or more wearables which may be worn by the driver, and can distinguish a random movement which was, perhaps, intended by the driver. When compiling the above movement patterns for each of the vehicle, electronic devices and/or wearables, it is contemplated that one or more of such movement patterns may be compared to each other to determine whether a suspicion of a vehicle accident occurrence involving the driver ought to be assigned.

In some implementations, the assigning the suspicion for an accident occurrence can be conducted in accordance with comparison of the personal data to predetermined thresholds for such data which are indicative of known vehicle accident occurrence. In some implementations, the assigning can be conducted in accordance with feeding various accident suspicion data of a plurality of data sources to a machine learning (ML) model configured to identify instances of accident occurrence. In doing so, the ML model can compare historical data of known accident occurrence and match relevant portions thereof to the accident suspicion data to determine a relevant identification of a suspicion of a vehicle accident occurrence.

In some implementations, the detection system can augment the assigning of the suspicion for an accident occurrence based on assessment of such above-discussed personal data likewise obtained from another driver that may be located at or near a location corresponding to that of the suspected accident occurrence. In some implementations, the detection system can further augment the assigning of the suspicion based on consideration of public or widely available data as may be relevant to the personal data of the driver and/or the other driver.

Once the suspicion can be assigned according to one or more of the implementations discussed above, the detection system can notify the driver of the vehicle suspected to have been in an accident occurrence in order to verify the suspicion. In some implementations, the notifying can entail a query requesting confirmation of the suspicion, and, in some cases, options in response to such confirmation, if provided. Such options can include, for instance, whether the driver would like to proceed with filing an insurance claim with respect to the now confirmed, i.e., detected, accident occurrence. That is, it will be understood by one of skill in the art that the assigning of the suspicion of an accident occurrence, as discussed herein, in conjunction with the receiving of a verification for the suspicion, define a detection of the vehicle accident occurrence.

In some implementations, a lack of response for the suspicion can trigger the dispatch of one or more notifications via one or more devices associated with the driver of the vehicle suspected of having been in an accident occurrence. The one or more notifications may, for example, seek verification of the suspicion for the vehicle accident occurrence from those capable of receipt and perception of the notifications at or near the scene of the suspected vehicle accident occurrence. In some implementations, a lack of response for the suspicion can trigger the dispatch of one or more data collection devices remote from a scene of the suspected vehicle accident occurrence in order to obtain data relating to the suspicion.

Existing manners for detecting a vehicle accident occurrence have focused on the analysis of relevant data after the occurrence. Such detection, therefore, fails to consider the developing, in real-time, of an automatedly generated suspicion for the occurrence based on receipt and real-time analysis of data from multiple, disparate information sources, whereas the suspicion may then be verified, in real-time, by an automatedly delivered query to a driver suspected to have been involved in the accident occurrence. In this way, the herein discussed detection system offers previously unavailable real-time opportunity for verification of the suspicion from a driver, such that an absence of the verification may trigger one or more additionally dispatched notifications for seeking such verification. As such, any of a received verification or lack thereof can serve as not only a means by which to uniquely cause the detection a vehicle accident occurrence, but also as a way of uniquely assessing a status of the health and welfare of the subject driver for causing, if applicable, the delivery of emergency medical services. Several implementations are discussed below in more detail in reference to the figures.

FIG. 1 is a block diagram illustrating an overview of devices on which some implementations of the disclosed technology can operate. The devices can comprise hardware components of a device 100 that generates a query as to whether a suspicion for a vehicle accident occurrence exists, and transmits such query to a driver of the vehicle so as to obtain verification of the suspicion. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, an accident detection system 164, and other application programs 166. Memory 150 can also include data memory 170, personal user (or driver) data, user (or driver)/vehicle profile data, user (or driver) sensor data, accident scene observation and/or sensor data, auxiliary user (or driver) sensor and/or observation data, public/widely available data, machine learning data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
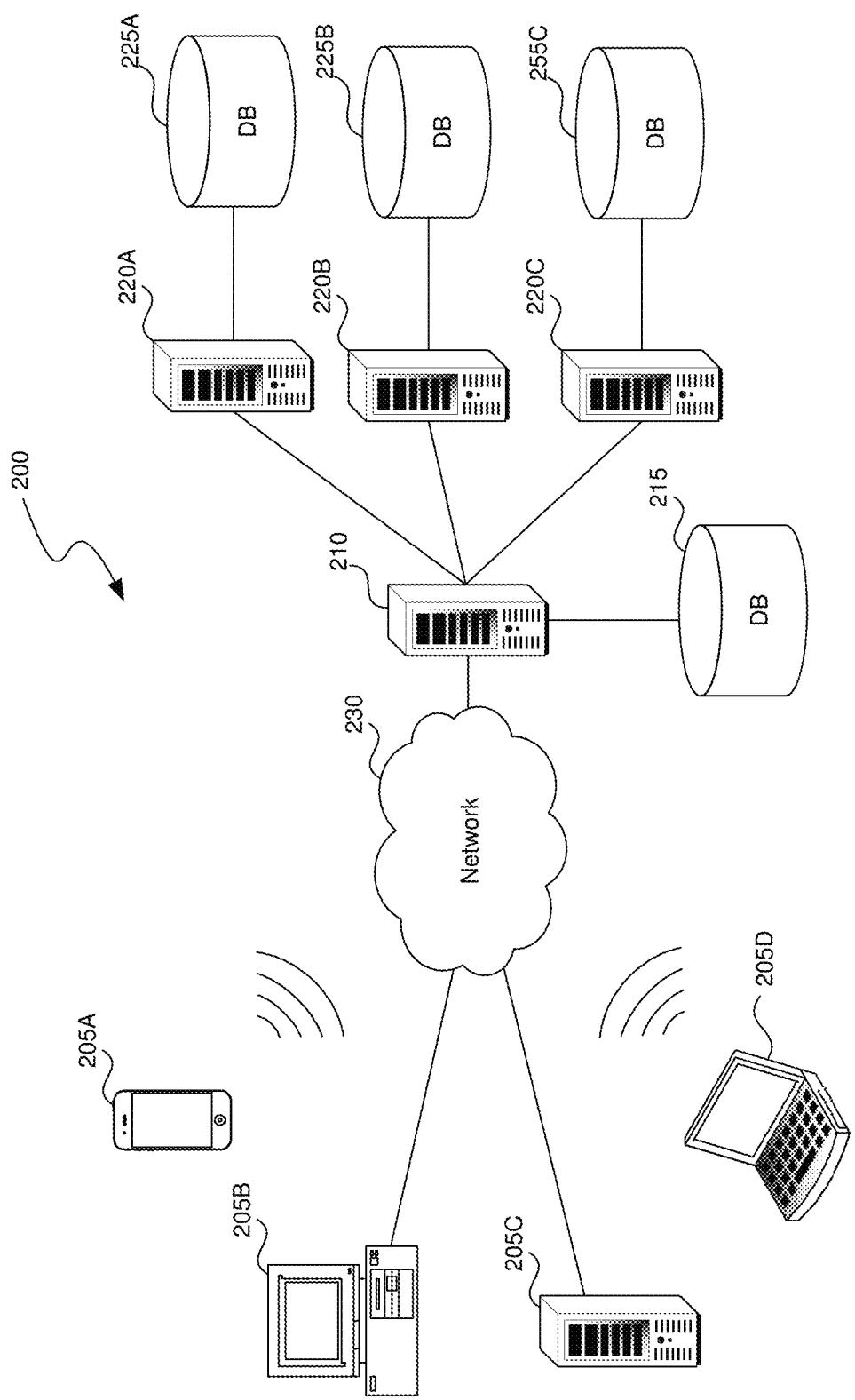
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as personalized user (or driver) data, user (or driver)/vehicle profile data, user (or driver) sensor data, accident scene observation and/or sensor data, auxiliary user (or driver) sensor and/or observation data, public/widely available data, machine learning data, and configuration data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
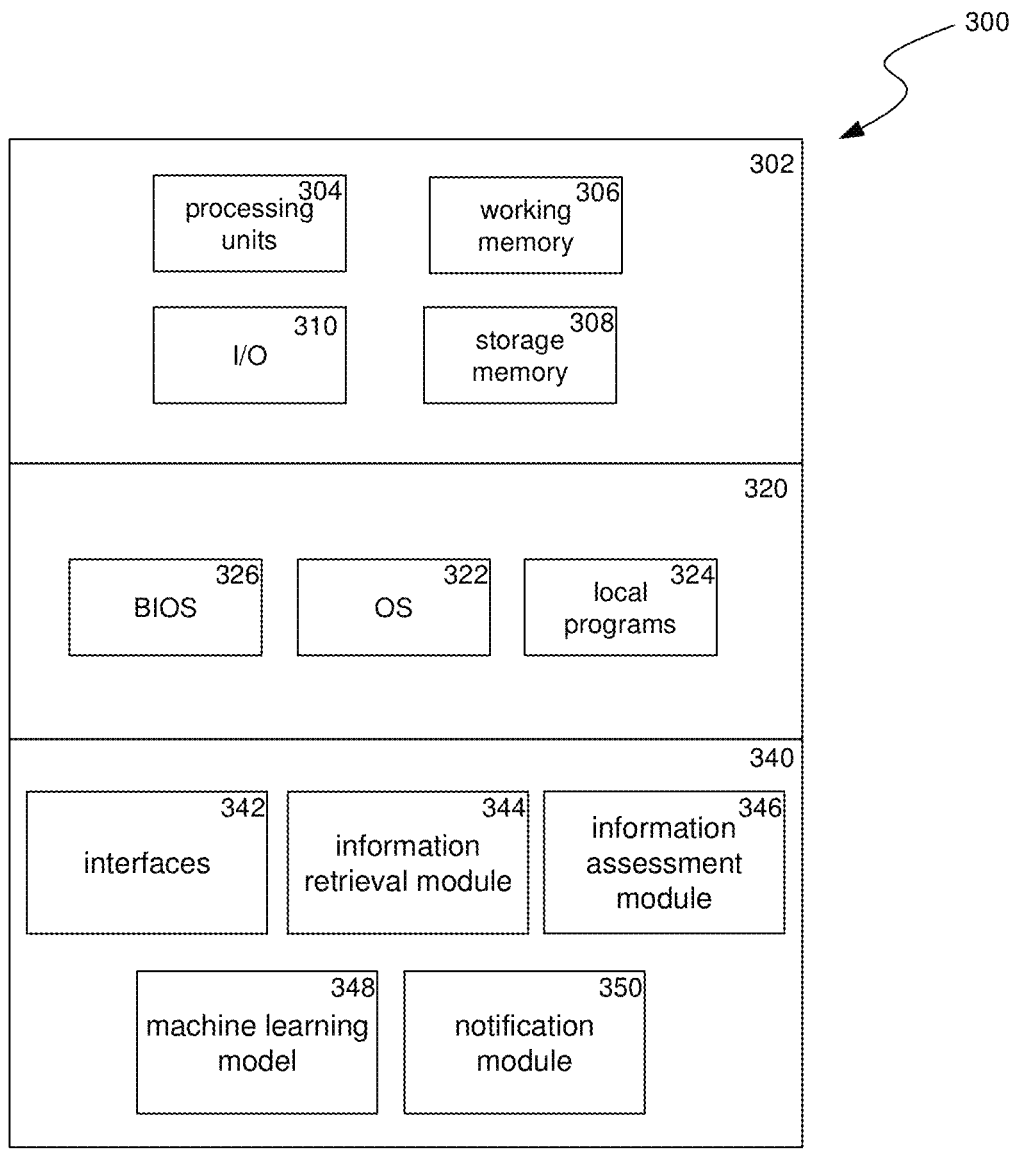
FIG. 3 is a block diagram illustrating components which, in some implementations, can be used in a system employing the disclosed technology.

FIG. 3 is a block diagram illustrating components 300 which, in some implementations, can be used in a system employing the disclosed technology, e.g., the accident detection system 164. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include information retrieval module 344, information assessment module 346, machine learning module 348, notification module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some implementations, the information retrieval module 344 can retrieve data to be provided by a vehicle of a driver, any sensing device used or worn by the driver, or any electronic device used by the driver for activities such as computing or communications, such as a cellular telephone, laptop computer, and/or PDA. Such retrieval may occur continuously or during one or more time periods, depending on the conditions of the release of personal information by the driver. In some implementations, information retrieval module 344 can also retrieve data to be provided by an auxiliary driver located at or near a scene of a suspected vehicle accident occurrence of the driver. In some implementations, information retrieval module 344 can retrieve information to be provided by a bystander at or near a location of a suspected vehicle accident occurrence. In some implementations, information retrieval module 344 can further retrieve accident scene observation and/or sensor data, as may be obtained from devices such as a drone. In some implementations, information retrieval module 344 can retrieve public/widely available data such as may be provided by crowd-sourcing outlets and pertinent to determining a suspicion of a vehicle accident occurrence. Additional details on such discussed information retrieval are provided below in relation to FIGS. 4-6.

In some embodiments, information assessment module 346 can intake data from the information retrieval module 344 to assess and assign a suspicion of a vehicle accident occurrence involving the driver of the vehicle. Additional details on conducting the assessment are provided below in relation to FIGS. 7-8B. For example, the assessment may be conducted on the basis of (a) comparison of one or more data retrieved by information retrieval module 344 to applicable predetermined thresholds for such data as may be derived from known accident occurrence (see FIG. 7), and/or (b) machine learning configured to identify instances of vehicle accident occurrence according to applicable training (see FIGS. 8A-8B).

In some embodiments, machine learning module 348 can convert one or more data obtained by information retrieval module 344, as well as historical data of known vehicle accident occurrence, to obtain training data by which to identify instances of vehicle accident occurrence. The machine learning module 348 can then apply the one or more data obtained by information retrieval module 344 to the trained machine learning module to determine whether a suspicion of a vehicle accident occurrence can be generated.

In some embodiments, notification module 350 can generate a notification to a driver of a vehicle for which a suspicion of vehicle accident occurrence has been generated. The notification can query the driver as to whether he or she has been involved in an accident. As will be understood, a positive response to the query fulfills a detection of a vehicle accident occurrence. In some embodiments, notification module 350 can also generate, in response to a lack of response from the driver, a query which may be more broadly perceptible by those in the same vehicle as the driver or in a vicinity of the driver's vehicle, such as through broadcast across the vehicle's infotainment system. Additionally, in some embodiments, notification module 350 can operate to dispatch one or more devices, such as one or more drones remotely located from a scene of a suspected vehicle accident occurrence, to inspect the scene and verify, through one or more data which may retrieved by information retrieval module 344, the suspicion of a vehicle accident occurrence as generated by information assessment module 346 and/or machine learning module 348. In some embodiments, notification module 350 can dispatch one or more notifications to EMS based on the circumstances of the verification.

Those skilled in the art will appreciate that the components illustrated in FIGS. 1-3 described above, and in each of the flow diagrams discussed below, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described below.

Figure 4:
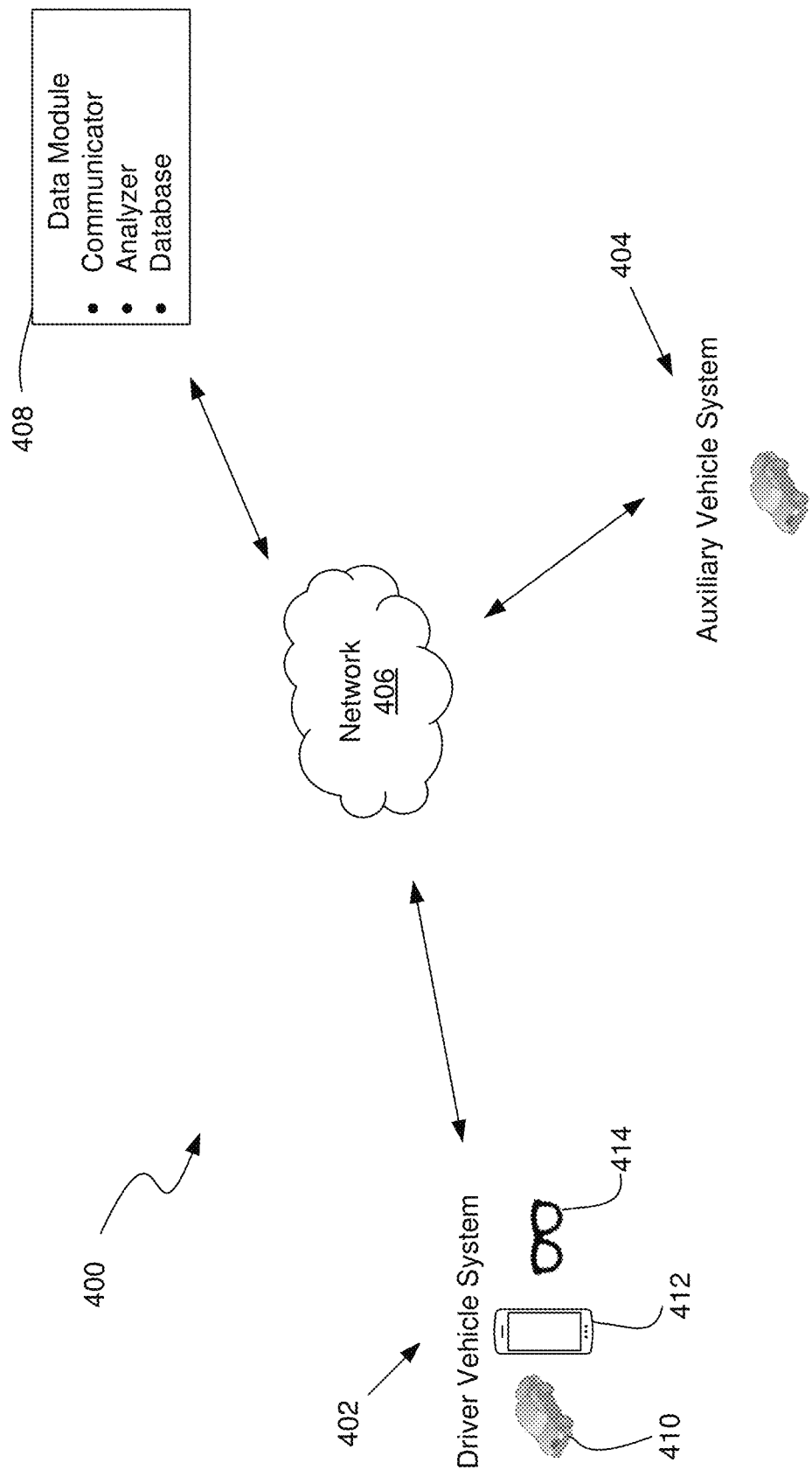
FIG. 4 is a high-level conceptual diagram illustrating a flow of personal data from multiple information sources to a back-end data module that can be used in some implementations of the present technology for assigning a suspicion of a vehicle accident occurrence.
Figure 5:
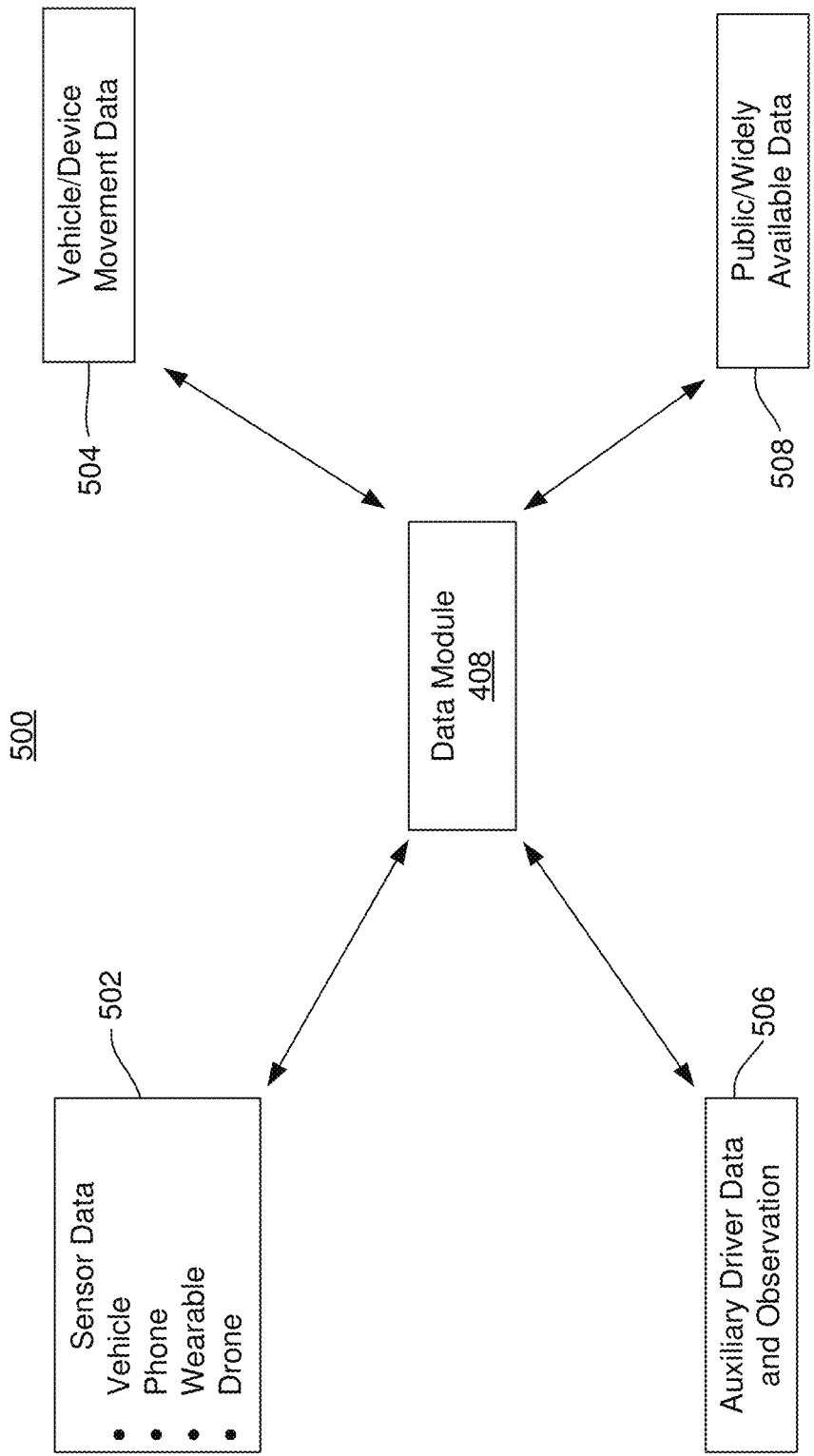
FIG. 5 is a flow diagram illustrating a collection of accident suspicion data that can be used in some implementations of the present technology for feeding the back-end data module of FIG. 4.

FIG. 4 is a high-level conceptual diagram illustrating a personal data gathering system 400 for implementing a flow of personal data from multiple information sources to a back-end data module 408 that can be used in some implementations of the present technology for assigning a suspicion of a vehicle accident occurrence. FIG. 5 is a flow diagram illustrating a collection of accident suspicion data 500 that can be used in some implementations of the present technology for feeding the back-end data module 408 of FIG. 4. In this regard, it is to be understood that the accident suspicion data 500 can comprise the personal data discussed thus far, as well as such other types of data are illustrated in FIG. 5. The accident suspicion data 500 can be data which may be generally assessed to determine whether a suspicion of a vehicle accident occurrence ought to be assigned according to some implementations of the present technology. In referring to FIGS. 4 and 5, the aforementioned information sources can include, for example, a driver vehicle system 402 to which the suspicion herein can be directed, and, optionally, an auxiliary vehicle system 404. Each of the vehicle systems 402 and 404, in response to a respective driver opting in to provide personal data to the accident detection system 164, as can be implemented according FIG. 3, can be configured for communication through a network 406, which can be similar to network 230. Accordingly, such personal data can be fed to the back-end data module 408 that can be implemented according to the components of FIG. 3 to comprise a communicator, an analyzer, and a database. The communicator can coordinate push/pull communications from any of the vehicle systems 402 and 404, and the analyzer can analyze data of the communications in accordance with implementations of the disclosed technology.

In particular, driver vehicle system 402 can represent and provide a myriad of personal data belonging to a driver for whom the present technology analyzes whether a suspicion of a vehicle accident occurrence ought to be assigned. Such personal data can comprise sensor data 502 which can be sourced from any of sensors of the vehicle 410, including, for example, proximity/distance sensors (e.g., Light Detection and Ranging (LIDAR)), an included IMU, weight and pressure sensors as may be respectively disposed in seating and a steering wheel, speed sensors, as well as from any included location/navigation systems. The personal data can also be sourced from any of individual devices which can be used by the aforementioned driver, including, for instance, any of a portable communications/computing device 412 such as a cellular telephone or laptop computer. For instance, in a case in which the cellular telephone can include one or more of sensors configured to measure, for example, proximity/acceleration, ambient lighting, moisture, and barometric pressure, data of such sensors may be fed to data module 408 with respect to assigning a suspicion of vehicle accident occurrence. As an example, combined GPS and acceleration data can be used to determine the feasibility of traveling a given distance over a given time period, such that reaching an endpoint of that distance in an inordinately minimal amount of time may be indicative of braking malfunction or excessive speed. As a further example, sensing for ambient lighting conditions that indicates low levels or non-existent levels therefor may be indicative that the cellular telephone has unexpectedly repositioned to a darkened area of the vehicle, or whether lighting from an oncoming vehicle was functioning. As still another example, sensing of high moisture content may be indicative of the vehicle being submersed. Yet further, obtaining a barometric reading may enable the accident detection system 164 of the present technology to verify, together with meteorological reporting, a location for the suspicion discussed herein when cross-checked against GPS data.

The personal data can further be sourced from, for instance, a wearable 414 or other such similar device capable of generating and/or recording data, such as biometric data including eye movement, blood pressure, heart rate, sleep pattern, and overall movement from a datum, e.g., rotation. Further examples of generated and/or recorded data can include an image recording. It is contemplated that one or more of the generated and/or recorded data can be respectively obtained from wearables 414 including, for example, eyewear, a ring, and/or a timepiece such as a wristwatch. In these regards, biometric data that can be collected by a given wearable 414 can be indicative of whether a suspicion for a vehicle accident occurrence involving the driver ought to be assigned. For example, rapid eye movement or eye dilation, as can be captured by a pair of smart glasses, may be indicative of increased anxiety level preceding or occurring during a vehicle accident occurrence. Additionally, sudden increases or spike in blood pressure, heart rate, and rotation, as can be measured by a wearable such as the wristwatch, can be indicative of a change in driving conditions, including, for instance, a collision with another object. In some cases, it is also contemplated that such a wristwatch can capture data which tracks sleep patterning, whereas representative data can be indicative of a loss of consciousness resulting from involvement in a vehicle accident occurrence.

The above-discussed personal data of a driver for which a suspicion of a vehicle accident occurrence can be assigned can also include vehicle movement data 504, which can be assessed, for instance, via a GPS enabled IMU of the vehicle of the driver. In this way, specific movement data 504 for the driver's vehicle may be compared to known accident and/or non-accident vehicle movement patterns for a same or similar vehicle (i.e., same or similar make, model, and year, for example) in order to determine whether accident detection system 164 ought to assign the aforementioned suspicion. Alternatively or in addition, movement data 504 as between multiple devices 412 in the vehicle 410 as determined through, for example, interferometry and/or based on respectively included and obtained IMU data, can be analyzed by accident detection system 164 when determining whether to assign the suspicion discussed herein. Such movement data 504 can be assessed based on a stoppage or other deviation from an intended route divulged to the vehicle accident detection system 164, which may implemented according to FIG. 3. For instance, if an intended route, perhaps obtained from GPS mapping in the vehicle, is not followed or the driver experiences a prolonged stoppage on that route, the vehicle accident detection system 164 can assign a suspicion of a vehicle accident occurrence. Alternatively or in addition, movement data may be assessed based on one or more wide area network (WAN) or local area network (LAN) connections among interconnected devices in a vehicle, for example, the aforementioned cellular telephone and the portable laptop. In such a case, a loss of signal from and/or between one or more of these devices can provide a basis on which a suspicion for a vehicle accident occurrence can be assigned. Still further, based on movement data 504 captured by one or more sensors of their respectively included IMUs, a motion of, for example, one or more computing and/or communications devices located within the vehicle can be analyzed to determine whether the movement data 504 for such devices is indicative of a suspicion of a vehicle accident occurrence. In doing so, the movement data of the vehicle 410 and/or one or more of devices 412 included in the vehicle 410 may be relatively compared to each other to determine whether it would appropriate for the accident detection system 164 to assign a suspicion of a vehicle accident occurrence. As an example, movement data 504 of the vehicle 410 and movement data 504 of one or more devices 412 can be analyzed to determine if they are, for instance, "aligned." In such a case, for example, if GPS and IMU data of the vehicle 410 indicates a sudden stoppage and movement data 504 of the one or more devices 412 indicates a sudden, high velocity shift in the forward or rearward direction, then it can be likely concluded that the vehicle 410 may have been involved in a vehicle accident occurrence. Conversely, one of devices 412 included in the vehicle 410 generates movement data 504 indicating vastly and comparatively divergent movement patterning as compared to the other devices in the vehicle, then it may also be likely that the device was moved, e.g., by a user and there was likely no vehicle accident occurrence.

Furthermore, it is also contemplated that the suspicion herein can be assigned based on auxiliary data 506 from an auxiliary driver data of, for example, auxiliary driver system 404, and/or passengers of vehicle driver system 402 and/or auxiliary vehicle driver system 404, as well as from data furnished by bystanders, assuming a release of personal data akin to that of a driver suspected to have been in a vehicle accident occurrence. Radio-frequency (RF) signaling of devices of individuals in a vicinity of a suspected vehicle accident occurrence can be used to triangulate, via interferometry, a location of a vehicle of the driver so as to provide further basis on which to assign the suspicion herein. This way, the suspicion can be based on, and perhaps assigned according to, movements of the vehicle prior to a final location for the vehicle 410. For instance, if the vehicle 410 was at position A at time t1 according to the triangulation, and is tracked to position B at time t2, the relative separation between positions with respect to the time differential can provide an indication of a manner of driving style, e.g., aggressive driving, which can afford a basis on which to assign the suspicion discussed herein.

In reference to the above and in one or more implementations, it is also contemplated that in an instance in which passengers in the vehicle 410 have similarly opted into the release of personal data from, for example, portable computing/communications devices, information from these devices may be used to validate a verified occurrence of a vehicle accident and/or presence and any related injury to such passengers. For instance, it would be expected that location services on all devices, i.e., those of the driver and the passengers, would indicate a common location at the time of the vehicle accident. As such, it will be understood that any conflict in location could indicate an invalidity of any claim for injury or property damage that may be asserted.

With respect to the personal information discussed thus far in regard to vehicle driver system 402, it is to be understood that the same define primary data for the driver and/or vehicle for which a suspicion of a vehicle accident occurrence may be assigned according to implementations of the present technology.

In some implementations of the present technology, the personal/primary data can be retrieved by information retrieval module 344 from one or more of wireless communications systems of any of, for example, the driver's cellular telephone 412 and/or the vehicle 410. In this regard, it is contemplated that the driver's cellular telephone 412 would be in communication with, for example, any wearable 414 of the driver whereas any information of the wearable 414 could then be gathered and transmitted from the cellular telephone 412 to the information retrieval module 344.

Alongside the above-discussed personal/primary data, accident detection system 164 can be configured to collect various ancillary data which can be used to verify one or more of the personal/primary data. In these regards, such data can include that which can be obtained from an analysis of public or widely available data 508 like that which may be obtained from, for example, crowd-sourcing outlets and/or government maintained/sponsored repositories. For example, such data may include information as to whether a confirmed accident occurred on a given date at a particular time and location, and when cross-checked against personal/primary data indicating same or similar information, the matching between the sets of data can be a basis for the suspicion discussed herein. Additionally, such ancillary data can also comprise data of an auxiliary driver system 404 comprising a driver and/or passengers thereof that have likewise opted into the release of any of the personal/primary data discussed above in reference to the driver of the vehicle for which a suspicion of a vehicle accident occurrence can be assigned. In this regard, one or more of such auxiliary driver systems, though only a singular system is depicted in FIG. 4, may be sources of ancillary data. For example, in a case in which an auxiliary driver has opted into the release of biometric data from, for instance, a wearable capable of recording visual imaging, such visual imaging may then be compared to imaging captured by a wearable of the driver suspected to have been in a vehicle accident occurrence and/or movement data of the vehicle 410 captured by any of its IMU, LiDAR, or similar functionality.

In a case in which a suspicion of vehicle accident occurrence has not been verified by a driver, as discussed herein, it can be necessary to determine why the lack of verification exists. The necessity can be borne out of concern for the safety, health and welfare of the driver. Thus, in response to the lack of verification by a driver, notification module 350, as shown in FIG. 3, may dispatch one or more notifications causing scene observation tools to arrive at the suspect location for the vehicle accident to obtain secondary data that can be used to verify the suspicion discussed herein. Such tools, in an exemplary implementation, may be positioned in areas where, historically, accident occurrences are prevalent, and include, for example, one or more drones (see 502) configured to be dispatched by the notification module 350 to collect, via one or more of included sensors and/or imaging capability, information that can be used to verify the suspicion discussed herein. For example, such information can be derived from any one or more of sensors configured to detect temperature, and/or chemical presence arising from, for example, fuel leakage and/or fire, and/or radio frequency so as to be able to determine an assessment of a vehicle 410, devices contained therein, and individuals which are present at the dispatched location. Also, such information can be plainly obtained from any imaging capability configured to aptly detect, relative to a flight elevation, any one or more of facial recognition, as well as aspects of an involved vehicle or vehicles, e.g., vehicle make and model, license plate number, and condition of a driver and any passenger(s). Further, it is also contemplated that the aforementioned drone can be configured with RF scanning capability to detect any RF transmission(s). Alternatively, the notification module 350 can be operative to initially dispatch a drone with lesser included ability, i.e., with only imaging capability or ability to drop emergency supplies, such that it may then itself dispatch a drone having the discussed combined sensor and imaging operability. In any case, use of a drone in the circumstance(s) described yields secondary data providing an ability to verify the primary data that can be received and used by the accident detection system 164 described herein when assigning the discussed suspicion. Further, in a case in which the drone may capture data and imaging for the subject suspicion and/or a peripheral accident, i.e., an accident not involving the underlying suspicion, the notification module 350 may be configured to publish its data and imaging in the form of a notification to local authorities, applicable insurance providers (e.g., providers with a broad coverage scope in the local of the accident), and/or crowd-sourcing outlets. In doing so, the accident detection system 164 of the present technology contributes to the general advisement of conditions affecting a given local.

In an instance in which verification of the suspicion discussed herein has not been received, notification module 350 can also be configured to dispatch one or more notifications to, for instance, those individuals that a driver has listed on his or her insurance policy that ought to be contacted in case of an emergency. This way, notification module 350 may provide a notification of a potential emergency involving the driver. Alternatively or in addition, such a notification may be communicated at a same time as delivery of the query for the suspicion originally communicated to the driver. In doing so, the notification serves as a way to verify whether the contact individuals were potentially also involved in a suspected vehicle accident.

Figure 6:
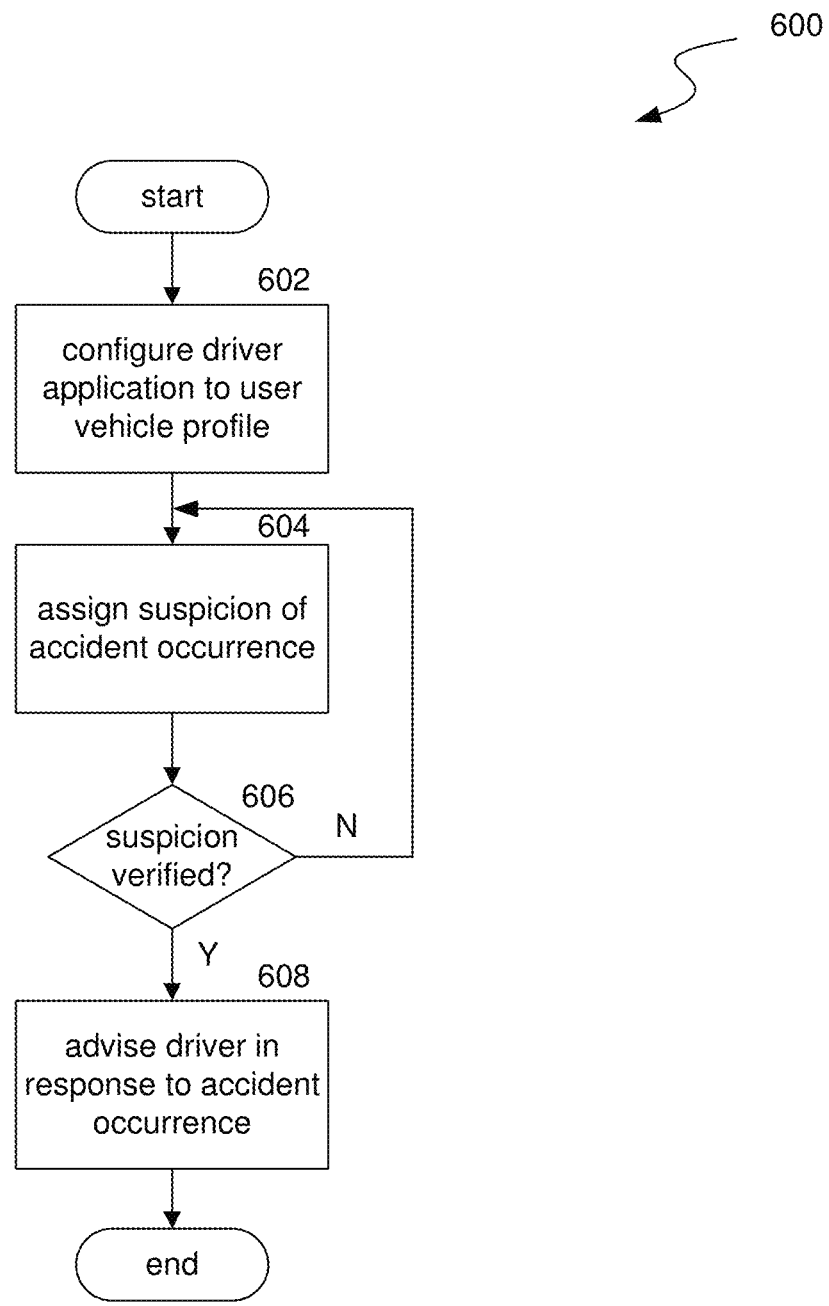
FIG. 6 is a flow diagram illustrating a process used in some implementations of the present technology for detecting a vehicle accident occurrence.

FIG. 6 is a flow diagram illustrating a process 600 used in some implementations of the present technology for detecting a vehicle accident occurrence. Process 600 can be initiated by a driver signing up for the accident detection service, as implemented, for example, via the components 300 of FIG. 3, for a given vehicle 410 covered by an insurance policy extended to the driver by a provider. Process 600 can be performed whenever the driver is operating his or her vehicle 410 covered by the policy. Accordingly, at block 602, process 600 can provide the driver the opportunity to configure the service to obtain a profile of the covered vehicle 410 including, for example, the make, model, and year.

At block 604, process 600 can assign a suspicion of a vehicle accident occurrence based on at least each of the available personal/primary data and/or one or more of other accident suspicion data discussed above. In this regard, movement data of the personal/primary data corresponding to that of the driver and/or the vehicle 410 may be assessed, i.e., compared, with an expected movement profile for the covered vehicle when assigning the suspicion. In other words, in determining whether the suspicion ought to be assigned to collected data, aspects of the collected data may be compared to movement profile characteristics, e.g., yaw and pitch, such that a severity of the analyzed movement may warrant assignment of the suspicion.

Aspects of the assignment implemented at block 604 are described in more detail with reference to FIGS. 7 and 8B.

At block 606, process 600 can dispatch one or more first notifications to the driver in the form of, for example, a query such as, "Were you in an accident?" in order to verify the suspicion of a vehicle accident occurrence involving the driver. The dispatch can, as has been discussed, be undertaken by notification module 350 of FIG. 3. Further, and as has discussed herein, in the event that the query is not answered, notification module 350 can, alternatively or in addition, dispatch one or more notifications across the vehicle's infotainment system inquiring or advising of a potential accident, such that those in the vehicle or area of the vehicle may be provided an opportunity to appropriately address the situation at the suspected accident scene.

At block 608, process 600 can advise the driver in response to verification of the suspicion from the driver as to further actions, including whether the driver would like to file a claim or be reminded to do so at a later time. In this regard, notification module 350 can be configured to receive the verification and dispatch one or more second notifications such as, for example, "Do you want to file a claim, or be reminded to do so at a later time?" Notification module 350 can also be configured to dispatch, in the event of a delay in response of, for example, more than about five (5) minutes, an alert to emergency services in the local of the suspected vehicle accident. In some implementations, such an alert can also be dispatched in the event that the verification query of block 606 draws no response or a positive response.

Figure 7:
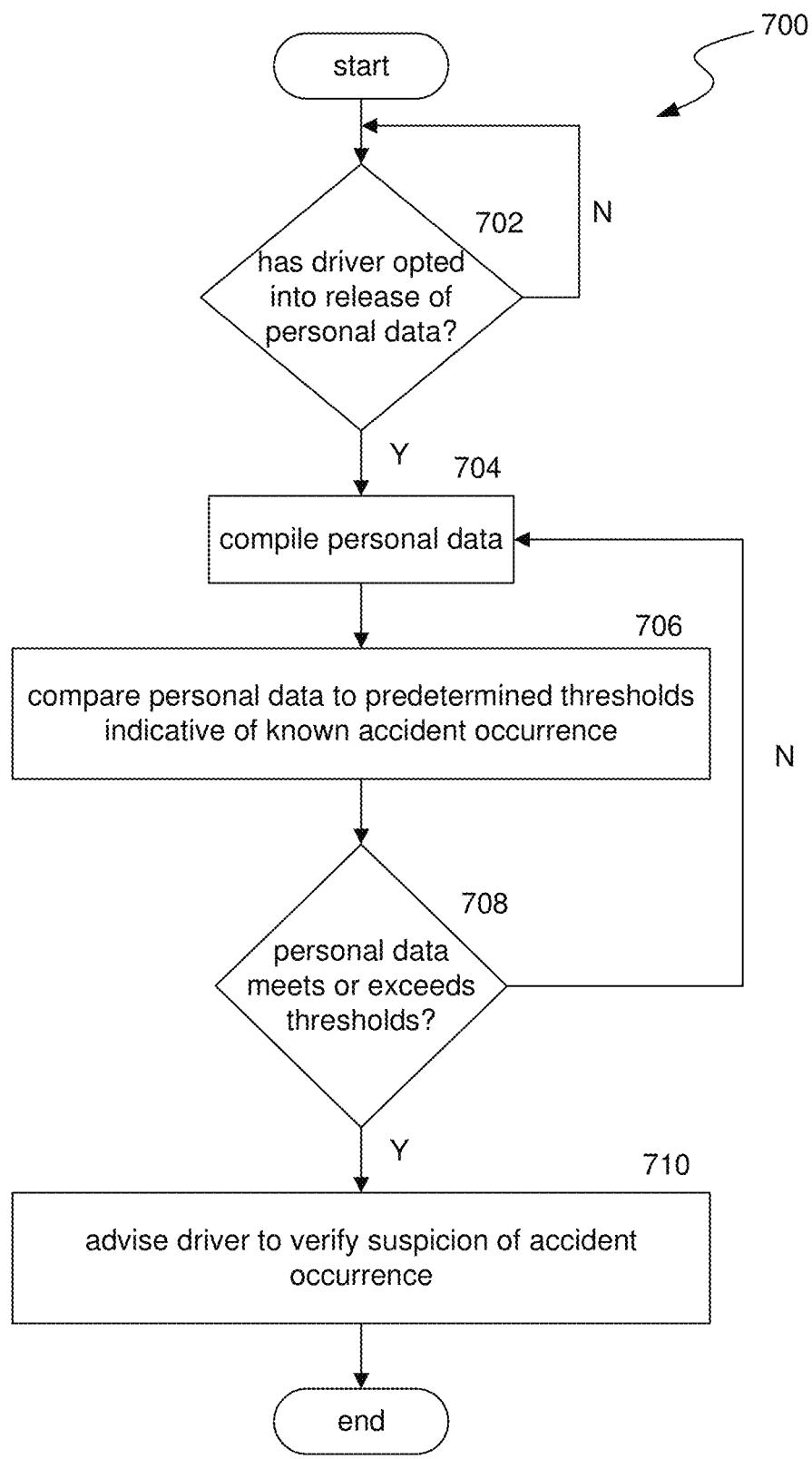
FIG. 7 is a flow diagram illustrating a process used in some implementations of the present technology for detecting a vehicle accident occurrence based on an assigned accident suspicion, derived from a comparison between personal data of a driver and predetermined thresholds for such data which are indicative of known vehicle accident occurrences.

FIG. 7 is a flow diagram illustrating a process 700 used in some implementations of the present technology for detecting a vehicle accident occurrence based on an assigned suspicion therefor derived from a comparison between personal/primary data of a driver and predetermined thresholds for such data which are indicative of known vehicle accident occurrence. Process 700 can be initiated by a driver signing up for the accident detection service, as implemented, for example, via the components 300 of FIG. 3 for a given vehicle 410 covered by an insurance policy extended to the driver by a provider. Process 700 can be performed whenever the driver is operating his or her vehicle 410 covered by the policy, for example as a sub-process of block 604 of FIG. 6.

At block 702, process 700 can cross-check one or more databases, such as those of FIG. 2, to determine whether the driver has opted into the release of personal/primary data for purposes of the accident detection system 164 of the present technology. If so, process 700 can proceed to, at block 704, compile the personal/primary data for the driver. Otherwise, process 700 can reinitiate to continually determine whether the driver has provided the aforementioned release.

At block 706, process can compare the compiled personal/primary data to predetermined thresholds for such personal/primary data and/or other accident suspicion data 500. The predetermined thresholds can be obtained from records of the insurance provider which provides insurance coverage to the vehicle 410 listed in the driver's vehicle profile. The records can comprise prior accident reports for the driver or other individuals enrolled with the insurance provider. The records can also comprise other information such as witness statements, adjuster investigations, vehicle repair reports, and payout information, etc. The predetermined thresholds can define, for example, any of a distance to speed ratio for indicating an excessive speed, such that an abrupt conclusion thereof may indicate a collision, a given average weight of an individual for which the sensed absence thereof may indicate ejection from a vehicle, a given average blood pressure for which a sensed sudden elevation thereof may indicate a response to a collision.

Alternatively or in addition, the predetermined thresholds can also define particular manners in which previously collected IMU data of studied vehicles and vehicle accidents involving them map to a given accident type. For example, particular impact magnitudes, rotational deviations or excursions, accelerations, and decelerations all may describe a particular movement patterning for a particular accident type. In this regard, such collected IMU data may define various threshold data for a given type of vehicle, for example, turning capability and maximum acceleration rate for a mid-size vehicle versus those for a compact vehicle. Still further, the predetermined thresholds can be different for differently collected IMU data, i.e., IMU data collected by a wearable such as a wristwatch may characterize movement data that contrasts with IMU data collected by a vehicle. As such, the predetermined threshold data may define comparisons for that type of device, allowing differently collected movement patterning to be compared to their corresponding thresholds to determine a similarity between the measured movement and the accident movement pattern defined for that device type. That is, if a movement measurement from a wearable is 60% similar to the wearable accident pattern and the movement measurement from a vehicle is 46% similar to the vehicle accident pattern, the overall determination may be a combined average of 53% likelihood of an accident having occurred for the vehicle 410 and wearable 414, which can be compared to an aggregate threshold level for assigning an accident suspicion. The aforementioned thresholds may encompass data covering data 506 of an auxiliary driver whereby IMU data of the auxiliary vehicle system 404 can be evaluated to determine a response to vehicle accident occurrence involving vehicle 410, e.g., a sudden decrease in acceleration resulting from the auxiliary vehicle of the auxiliary driver system 404 impacting a rear end portion of the vehicle 410 of driver vehicle system 402. Likewise, the predetermined threshold data may define data for accident likelihood, as obtained from among historically known public/widely available data and which, for example, may describe propensities for vehicle accident occurrence at certain times on certain highly trafficked roadways. In these regards, it is contemplated that predetermined threshold data can be derived from the aforementioned historical data with respect to any one or more aspects of the accident suspicion data 500 of FIG. 5.

At block 708, process 700 can determine whether any of the personal/primary data and/or accident suspicion data 500 meets or exceeds one or more of the predetermined thresholds. For example, if a given one of collected IMU data from the vehicle 410 exceeds a corresponding predetermined threshold, the accident detection system 164 can assign a suspicion of vehicle accident occurrence. Likewise, process 700 can determine whether one or more of any of the accident suspicion data 500 described with reference to FIG. 5 meets or exceeds their respective thresholds such that a considered combination of relative measurements for a driver of vehicle 410 may be indicative of a vehicle accident occurrence. For example, if such vehicle IMU data fails to meet the respectively deduced threshold, but heart rate data collected from a wearable, such as the discussed wristwatch, meets or exceeds a determined threshold, the combination of the IMU data and the wearable data can be deemed sufficient by the accident detection system 164 to assign the suspicion discussed herein. Accordingly, the process 700 can assign a suspicion of a vehicle accident occurrence with respect to the collected personal/primary data and/or accident suspicion data 500, in accordance with assignment discussed above with reference to block 604 of FIG. 6. Otherwise, process can return to block 704 where it selects further personal/primary data for the loop between blocks 704-708.

At block 710, process 700 can advise a driver, via notification module 350 of FIG. 3, to verify the suspicion of a vehicle accident occurrence, whereupon notification module 350 may then proceed to issue further notification(s) as addressed above.

Figure 8A:
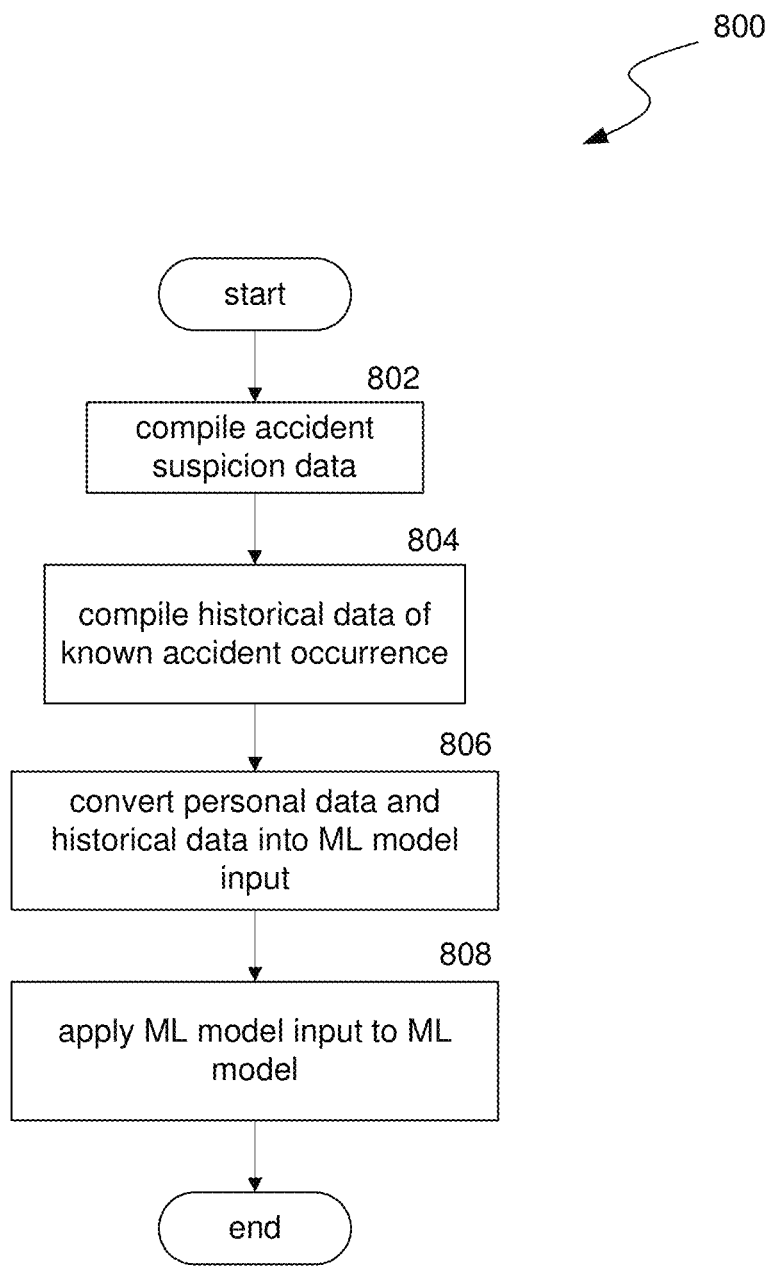
FIG. 8A is a flow diagram illustrating a process used in some implementations of the present technology for training a machine learning model to identify instances of vehicle accident occurrence based on the accident suspicion data of FIG. 5 and historical data for known vehicle accident occurrences.

FIG. 8A is a flow diagram illustrating a process 800 used in some implementations of the present technology for training a machine learning model to identify instances of vehicle accident occurrence based on the aforementioned accident suspicion data 500 of FIG. 5 and historical data for known vehicle accident occurrence.

At block 802, process 800 can compile the accident suspicion data 500 for the driver. As discussed above, and with reference to FIG. 5, such accident suspicion data 500 can comprise one or more of sensor data 502, whether from, for example, a vehicle 410, an electronic device 412, or a wearable 414 of a driver of vehicle 410, as well as from a scene observation tool, such as a drone. Such accident suspicion data can also comprise one or more of the above-discussed vehicle movement and contained device data 504, auxiliary driver data and observation 506, and public/widely available data 508 which may be relevant to a location of a suspected vehicle accident occurrence for the vehicle 410.

At block 804, process 800 can compile historical data of known accident occurrence. The data can be derived from sensor data and records of accidents, e.g., from insurance providers (which provides insurance coverage to the vehicle 410 listed in the driver's vehicle profile), car manufactures, traffic cameras, mobile devices in cars during accidents, etc. The records can comprise prior accident reports for the driver or other individuals enrolled with the insurance provider. The records can also comprise other information such as witness statements, adjuster investigations, vehicle repair reports, and payout information, etc.

At block 806, the process 800 can convert the accident suspicion data 500 and historical data to machine learning (ML) model input as training data. Data items of the accident suspicion data 500 and the historical data can be matched according to, for example, type, applicable range or amount, and/or accident occurrence verification. For example, data demonstrating deceleration from a speed of 60 mph in a timeframe of less than 6 seconds may be matched with commensurate data of the historical data for defining a respective ML model input for a deceleration. Such an input can then be paired with an output for a vehicle accident occurrence indicating a vehicle accident occurrence based on the correspondence between the matched decelerations, such that the pairing can then be used as relevant training data for defining a suspicion of a vehicle accident occurrence according to the present technology. As another example, one or more of the accident suspicion data 500, as defined according to FIGS. 4 and 5, may be paired with a known instance of an accident occurrence, as verified, for example, by submission by a driver of an insurance claim or accident report, to define a further training item for the ML model. In some implementations, the pairings may be assigned confidence scores, such that a predetermined threshold aggregate score for one or more pairings must be satisfied before the pairing can be used as a training item for the model.

At block 808, process 800 can apply the ML model input to a machine learning model. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. The machine learning model can be trained with supervised learning, where the training data includes individual instances of the accident suspicion data 500 matched to the historical data as input, which is then paired with a desired output, such as an indication as to whether an accident occurred. A representation of the matching between the accident suspicion data 500 and the historical data can be provided to the model. Output from the model can be compared to the desired output for that potential accident and, based on the comparison, the model can be modified, such as by changing weights between nodes of the neural network or parameters of the functions used at each node in the neural network (e.g., applying a loss function). After applying each of the pairings of the inputs and the desired outputs in the training data and modifying the model in this manner, the model is trained to evaluate new instances of whether a suspicion for a vehicle accident occurrence ought to be assigned to subsequently fed accident suspicion data 500. A new data item can have parameters that a model can use to assign a classification to the new data item. As another example, a model can be a probability distribution resulting from the analysis of training data, such as a likelihood of an input matching a conclusion, a given a particular input, based on an analysis of a large corpus of inputs with corresponding correct conclusions. Examples of models include: neural networks (traditional, deeps, convolution neural network (CSS), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

Figure 8B:
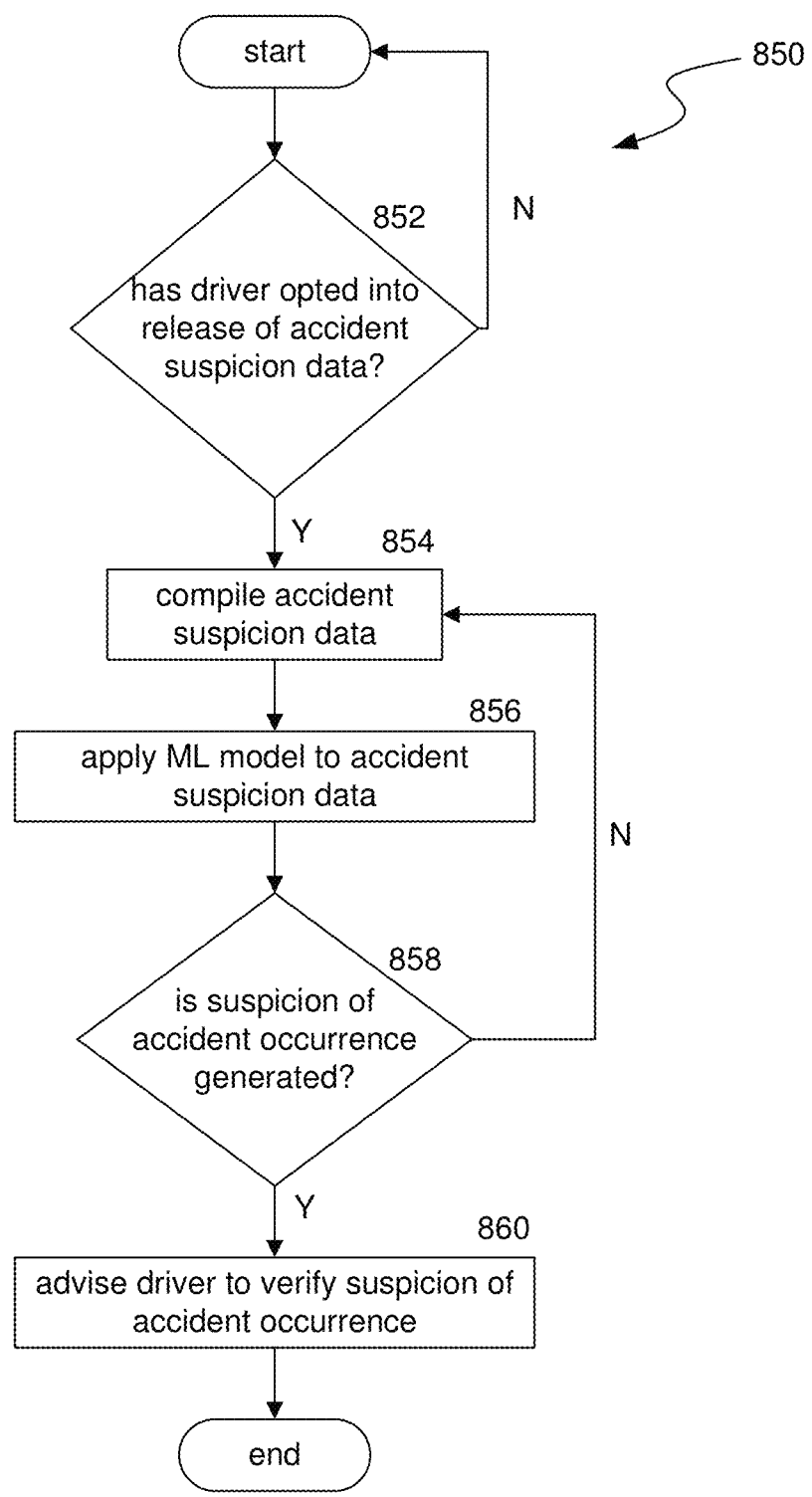
FIG. 8B is a flow diagram illustrating a process used in some implementations of the present technology for detecting a vehicle accident occurrence based on an assigned accident suspicion derived from an application of the machine learning model of FIG. 8A.

FIG. 8B is a flow diagram illustrating a process 850 used in some implementations of the present technology for detecting a vehicle accident occurrence based on an assigned suspicion therefor derived from an application of the machine learning model of FIG. 8A to accident suspicion data 500 for a driver of vehicle driver system 402, as shown in FIG. 5. Process 850 can be initiated by a driver signing up for the accident detection service, as implemented, for example, via the components 300 of FIG. 3 for a given vehicle 410 covered by an insurance policy extended to the driver by a provider. Process 850 can be performed whenever the driver is operating his or her vehicle 410 covered by the policy.

At block 852, process 850 can cross-check one or more databases, such as those of FIG. 2, to determine whether the driver has opted into the release of personal/primary data for purposes of the accident detection system 164 of the present technology. If so, process 850 can proceed to, at block 854, compile the accident suspicion data 500 of FIG. 5 for the driver. Otherwise, process 850 can reinitiate to continually determine whether the driver has provided the aforementioned release.

At block 856, process 850 can apply the ML model to the accident suspicion data of the driver to determine, at block 858, whether a suspicion of a vehicle accident occurrence is satisfied and ought to be generated, based on application of the complied accident suspicion data 500 to the model trained as discussed with reference to process 800 of FIG. 8A. If so, process 850 can invoke notification module 350, at block 860, to advise the driver to verify the suspicion and provide for any other notification(s) as have been discussed herein.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of automatically detecting a vehicle accident occurrence, the method comprising:
    obtaining sensor data from (a) one or more first sensors of one or more electronic communications devices and/or one or more wearable devices of a driver of a vehicle and (b) one or more second sensors of the vehicle, the sensor data defining at least one or more movement measurements during operation of the vehicle within a same time period;
    assigning, based on the sensor data, a suspicion for the vehicle accident occurrence, the assignment of the suspicion for the vehicle accident occurrence being based on (i) the sensor data meeting or exceeding one or more predetermined thresholds as derived from historical accident data, and (ii) application of a machine learning model to the at least one or more movement measurements of the sensor data, the machine learning model being trained to identify accident suspicions using historical movement measurements mapped to known instances of accidents as training data;
    in response to assigning the suspicion for the vehicle accident occurrence, dispatching one or more first notifications to the driver to verify the suspicion, a verification of the suspicion defining a detection of the vehicle accident occurrence; and
    based on a lack of a response of the driver to the one or more first notifications, triggering one or more additional actions, the one or more additional actions including:
        A) broadcasting a query, to verify the suspicion for the vehicle accident occurrence, across an infotainment system of the vehicle,
        B) dispatching one or more data collection devices, outside of the vehicle, to verify the suspicion for the vehicle accident occurrence,
        C) alerting emergency services of the suspicion for the vehicle accident occurrence,
        D) dispatching one or more second notifications to one or more emergency contacts of the driver, or
        E) any combination thereof.

2. The method of claim 1,
wherein the accident suspicion data further comprises biometric data of the driver.

3. The method of claim 1,
wherein the sensor data comprises data defined by both: an inertial measurement unit (IMU) of one or more of the wearables determined to be within the vehicle and an IMU of the vehicle.

4. The method of claim 3,
wherein the assigning the suspicion for the vehicle accident occurrence comprises one or more comparisons of: the historical accident data to a pattern of movement defined by the IMU data.

5. The method of claim 1,
wherein the historical movement measurements include data, measured from vehicle and wearable device sensors, identified as being associated with an accident based on correlations of the historical accident data to timing of insurance claims.

6. The method of claim 1,
wherein the vehicle is a first vehicle; and
wherein the sensor data further comprises data associated with a second vehicle other than the first vehicle.

7. The method of claim 1,
further comprising determining receipt of the verification from the driver, and, in response to receipt of the verification, dispatching one or more second notifications to the driver querying the driver as to processing of an insurance claim for the vehicle accident occurrence.

8. A computing system for automatically detecting a vehicle accident occurrence, the computing system comprising:
    one or more processors; and
    one or more memories storing instructions that, when executed by the one or more processors, cause the computing system to perform a process comprising:

obtaining sensor data from (a) one or more first sensors of one or more electronic communications devices and/or one or more wearable devices of a driver of a vehicle and (b) one or more second sensors of the vehicle, the sensor data defining at least one or more movement measurements during operation of the vehicle within a same time period;

assigning, based on the sensor data, a suspicion for the vehicle accident occurrence, the assignment of the suspicion for the vehicle accident occurrence being based on (i) the sensor data meeting or exceeding one or more predetermined thresholds as derived from historical accident data, and (ii) application of a machine learning model to the at least one or more movement measurements of the sensor data, the machine learning model being trained to identify accident suspicions using historical movement measurements mapped to known instances of accidents as training data;

in response to assigning the suspicion for the vehicle accident occurrence, dispatching one or more first notifications to the driver to verify the suspicion, a verification of the suspicion defining a detection of the vehicle accident occurrence; and based on a lack of a response of the driver to the one or more first notifications, triggering one or more additional actions, the one or more additional actions including:
  A) broadcasting a query, to verify the suspicion for the vehicle accident occurrence, across an infotainment system of the vehicle,
  B) dispatching one or more data collection devices, outside of the vehicle, to verify the suspicion for the vehicle accident occurrence,
  C) alerting emergency services of the suspicion for the vehicle accident occurrence,
  D) dispatching one or more second notifications to one or more emergency contacts of the driver, or
  E) any combination thereof.

9. The computing system of claim 8,
wherein the sensor data meeting or exceeding the one or more predetermined thresholds includes a comparison of (A) a profile of movement data determined to have been gathered during accidents and (B) the one or more movement measurements included in the sensor data.

10. The computing system of claim 8,
wherein the sensor data comprises data defined by both:
an inertial measurement unit (IMU) of one or more of the wearables determined to be within the vehicle and an IMU of the vehicle.

11. The computing system of claim 10,
wherein assigning the suspicion for the vehicle accident occurrence comprises one or more comparisons of: the historical movement measurements to a pattern of movement defined by the IMU data.

12. The computing system of claim 8,
wherein the historical movement measures include data, measured from vehicle and wearable device sensors, identified as being associated with an accident based on correlations of the historical movement measurements to timing of insurance claims.

13. The computing system of claim 8,
wherein the vehicle is a first vehicle; and
wherein the sensor data further comprises data associated with a second vehicle other than the first vehicle.

14. The computing system of claim 8,
wherein the process further comprises determining receipt of the verification from the driver, and, in response to receipt of the verification, dispatching one or more second notifications to the driver querying the driver as to processing of an insurance claim for the vehicle accident occurrence.

15. A non-transitory machine-readable storage medium having machine-executable instructions stored thereon that, when executed by one or more processors, cause the one or more processors to perform a method for automatically detecting a vehicle accident occurrence, the method comprising:

obtaining sensor data from (a) one or more first sensors of one or more electronic communications devices and/or one or more wearable devices of a driver of a vehicle and (b) one or more second sensors of the vehicle, the sensor data defining at least one or more movement measurements during operation of the vehicle within a same time period;

assigning, based on the sensor data, a suspicion for the vehicle accident occurrence, the assignment of the suspicion for the vehicle accident occurrence being based on (i) the sensor data meeting or exceeding one or more predetermined thresholds as derived from historical accident data, and (ii) application of a machine learning model to the at least one or more movement measurements of the sensor data, the machine learning model being trained to identify accident suspicions using historical movement measurements mapped to known instances of accidents as training data;

in response to assigning the suspicion for the vehicle accidence occurrence, dispatching one or more first notifications to the driver to verify the suspicion, a verification of the suspicion defining a detection of the vehicle accident occurrence; and based on a lack of a response of the driver to the one or more first notifications, triggering one or more additional actions, the one or more additional actions including:
  A) broadcasting a query, to verify the suspicion for the vehicle accident occurrence, across an infotainment system of the vehicle,
  B) dispatching one or more data collection devices, outside of the vehicle, to verify the suspicion for the vehicle accident occurrence,
  C) alerting emergency services of the suspicion for the vehicle accident occurrence,
  D) dispatching one or more second notifications to one or more emergency contacts of the driver, or
  E) any combination thereof.

16. The non-transitory machine-readable storage medium of claim 15, wherein the sensor data further comprises:
biometric data of the driver;
data defined by an inertial measurement unit (IMU) of one or more of the wearables determined to be within the vehicle; and
data defined by an IMU of the vehicle.

17. The non-transitory machine-readable storage medium of claim 15,
wherein the assigning the suspicion for the vehicle accident occurrence comprises one or more comparisons of: the historical accident data to a pattern of movement defined by one or both of: data from an inertial measurement unit (IMU) of one or more of the wearables determined to be within the vehicle or data from an IMU of the vehicle.

18. The non-transitory machine-readable storage medium of claim 15,
   wherein the historical movement measurements include data, measured from vehicle and wearable device sensors, identified as being associated with an accident based on correlations of the historical accident data to timing of insurance claims.

19. The non-transitory machine-readable storage medium of claim 15,
   wherein the method further comprises determining receipt of the verification from the driver, and, in response to receipt of the verification, dispatching one or more second notifications to the driver querying the driver as to processing of an insurance claim for the vehicle accident occurrence.

20. The non-transitory machine-readable storage medium of claim 15,
   wherein the vehicle is a first vehicle; and
   wherein the sensor data further comprises data associated with a second vehicle other than the first vehicle.

\* \* \* \* \*